Dec. 5, 1944.  G. B. THIEME  2,364,252
SAFETY DEVICE
Filed July 31, 1942
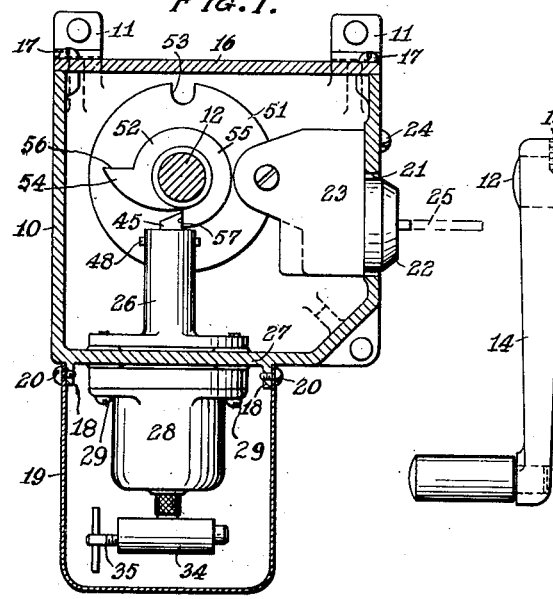
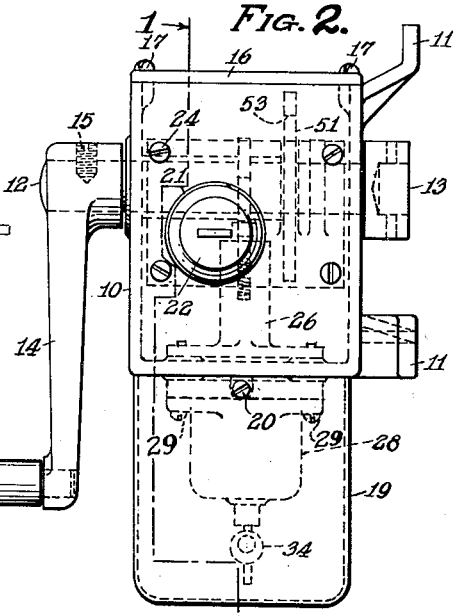
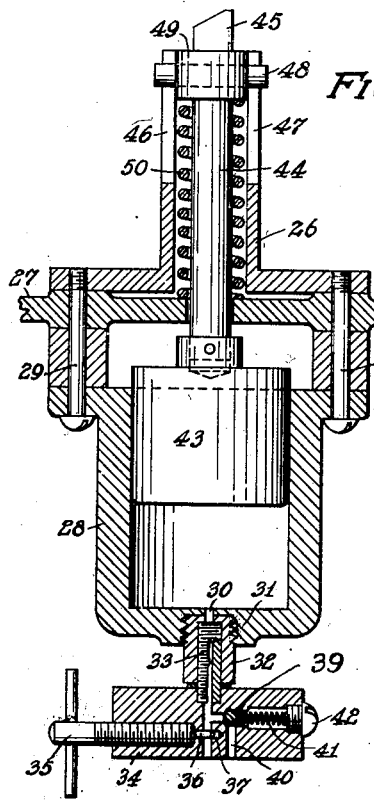
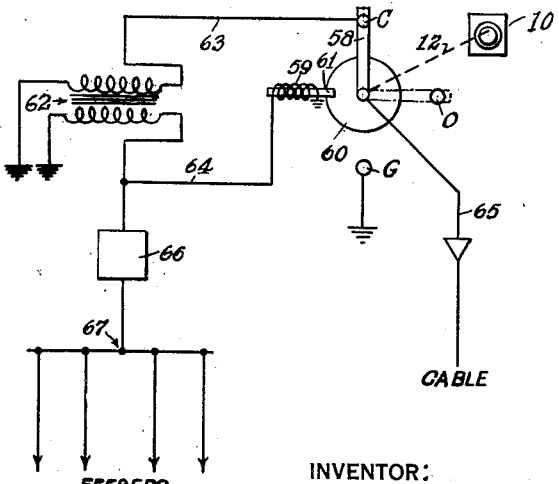
INVENTOR:
GEORGE B. THIEME
BY
ATTORNEY Patented Dec. 5, 1944

2,364,252

UNITED STATES PATENT OFFICE 2,364,252

SAFETY DEVICE

George B. Thieme, Richmond Hill, N. Y., assignor to Bendix Aviation Corporation, South Bend, Ind., a corporation of Delaware Application July 31, 1942, Serial No. 453,114

7 Claims. (Cl. 200—50)

This invention relates to circuit conditioning devices, and in particular, to a means for controlling the switching sequence to be followed in the application of a power cable to one or more distribution circuits, particularly when the arbitrary application of power to the circuits might endanger the life of a workman servicing the cable unknown to the switch operator.

It is convention for stations having a main power cable and a series of feeders, usually low voltage, high power feeders, to provide a three-position master network switch between the power cable and the transformer common to the feeders. This switch is of the rotary type and is provided with an open, or neutral contact, a closed, or feeder energizing contact, and a grounded contact. Ordinarily, some sort of supervision, either mechanical or human, is provided in an effort to prevent the network switch from being thrown to the grounded contact from the open or neutral contact, without being first thrown to the closed circuit contact, since operation to the grounded contact whenever the main power cable is energized, might result in injury to, or the death of, a workman repairing or adjusting equipment in circuit with the main power cable. If the main power cable is energized, then when the switch is thrown to the "closed" contact, it will be locked in the closed position by a standard solenoid-operated latch energized by a circuit in parallel to the main power cable, preventing operation of the switch to the grounded contact.

It is an object of the present invention to provide a novel sequence controlling mechanism for network switches whereby operation of the switch to the grounded condition prior to operation to the closed circuit contact, is prohibited.

It is another object of the invention to provide a novel sequence controlling device for a network switch that will prevent accidental or unauthorized grounding of an energized cable.

Another object is to provide a three-position shaft assembly with a locking device which, when the shaft is disposed in its mid-position, makes it necessary to rock the shaft assembly into one extreme position, before it can be rocked into its other extreme position, and positively precludes any other sequence of operation.

Further objects of the invention include the provision of a novel tamperproof interlock device for network switches that eliminates the possibility of the accidental grounding of an energized cable, and the provision of a novel sequence operated device wherein a predetermined sequence of switching must be followed in the changing of a network circuit.

Other objects of the present invention will become apparent from a study of the specification when considered along with the attached drawing, wherein Fig. 1 is a cross-sectional view of a switch interlock of the present invention, taken along the line 1—1 of Fig. 2.

Fig. 2 is an end elevational view of the same switch interlock.

Fig. 3 is a sectional, detail view of the interlock shown in Fig. 1; and

Fig. 4 is a schematic diagram of a typical circuit in which the novel switch interlock of the present invention may be used.

In accordance with the present invention, a switch interlock or sequence controlling device is intended for connection to the rotary blade of a switch controlling the application and distribution of power to a series of feeders from a main power cable. An essential part of the switch interlock of the present invention is an obstructing mechanism, the use of which, in combination with the conventional magnetic switch latching solenoid, results in a sequence controlling interlock for preventing the misapplication of power to the grounded switch contact and the unauthorized changing of the switch circuit when such change and misoperation might result in an accident to a workman.

One form of interlock of the present invention comprises a housing 10 having integral mounting lugs 11 and a shaft 12 extending completely through housing 10 and terminating at one end with a conventional switch engaging coupling 13 keyed to the shaft 12, and at its other end with a handle member 14 fixed to shaft 12 with an ordinary set screw 15. Housing 10 has a removable closure plate 16 attached by means of screw studs 17 to the main body of housing 10. The bottom portion of housing 10 has a series of circumferentially spaced depending lugs 18, to which is attached a cup-shaped can or enclosing member 19 by means of the studs 20. One face of housing 10 is provided with a circular aperture 21 through which extends the barrel 22 of a conventional cylindrical lock 23. This lock is attached to an interior wall of housing 10 by means of a plurality of screw members 24. Lock 23 has the usual slot for receiving a key member 25, shown in dotted outline in Fig. 1.

An upstanding hollow sleeve or guide rod 26 is carried on the interior surface of the bottom wall 27 of housing 10. Directly beneath guide member 26, and attached on the outer surface of wall 27, is a hollow cup or dash-pot 28, and the sleeve 26 and pot 28 are secured together through wall member 27 by means of the studs 29. The bottom of dash-pot 28 has a small aperture 30 and a counter-bore 31, into which is threaded a screw sleeve 32, carrying a hollow attaching screw 33, which extends downwardly from screw sleeve 32 for engagement with a cylindrical valve housing 34. Valve housing 34 contains a manually adjustable valve 35, which carries a metering pin 36 in a bore 37 transversely of the main bore or channel 38, which extends completely through valve housing 34 and into the interior of dash-pot 28. A check valve, comprising a cylindrical valve head 39, seats within passageway 40 and is urged to its position closing the passageway by means of a spring 41, which is held within housing 34 by cap screw 42. A piston 43 is fitted within the smooth cylindrical bore of dash-pot 28, and is attached to a piston rod 44, which terminates in an obstruction member or head 45 projecting above the hollow sleeve 26. As shown in Fig. 3, sleeve 26 has oppositely disposed slots 46 and 47, which carry a pin member 48 passing through the upper portion of piston rod 44 and through the enlarged cylindrical collar 49. A helical spring 50 is compressed within collar 26 and has its lower end carried against the interior of the bottom wall 27, while its upper end presses against the inner surface of the enlarged collar 49.

Transverse shaft 12 carries a circular disc member 51 and a cam plate 52 axially spaced from disc member 51 by a short distance. Cam plate 52 and disc member 51 are keyed to shaft 12 by any conventional means (not shown) so that they are both rotated upon rotation of shaft 12. Disc 51 has three notches 53 (only one of which is shown in Fig. 1), which are spaced about the periphery of disc 51 at angular positions corresponding to the closed, open and grounded switch blade contact positions, and when one of these notches is opposite the cylindrical lock 23, the handle 14 may be locked in position so that upon withdrawal of key 25, no unauthorized person may make a circuit change. Fig. 1 represents the angular position in which the switch blade is on the open, or neutral, contact. A hidden notch 53, cooperating with lock 23, can lock the switch in this position.

Cam plate 52 includes a cam surface 54 of generally spiral development, an adjacent dwell portion 55 and shoulder portions 56 and 57, which are spaced slightly more than 90 degrees apart.

As viewed in Fig. 1, shaft 12 may not be rotated in the clockwise direction, as shoulder 57 is in engagement with the obstructing head 45. Assuming that the notch 53 lying opposite lock 23, with shaft 12 in the position represented by Fig. 1, has been released by the lock retainer, then shaft 12 may be rotated in the counter-clockwise direction, since cam surface 54 will depress obstruction head 45 within the split sleeve 26.

The depth of slots 46 and 47 is such that pin 48 will come to rest at the bottom of the slots after shaft 12 has been rotated counter-clockwise 90 degrees from shoulder 57. It has been stated above that shoulders 56 and 57 are spaced slightly more than 90 degrees, and thus, after head 45 has been completely depressed into sleeve 26, there will still be a few degrees of cam surface in contact with the oblique top surface of head 45. This counter-clockwise rotation 90 degrees from the position shown in Fig. 1 results in moving the switch blade into closed circuit position. At the same time, one of the notches 53 has been moved into engagement with lock 23, and the switch may be locked in closed position if desired.

If, upon rotation of the switch to the closed circuit, it is not either automatically locked in its position by the conventional solenoid latch built into the switch housing, or by the interlock operator, the shaft 12 may be quickly rotated clockwise so that shoulder 57 will clear obstruction head 45 before its return to its topmost position, and then shaft 12 may be rotated clockwise 90 degrees from the position shown in Fig. 1, at which position the switch will be on the grounded contact. The notch 53 showing in Fig. 1 will then be opposite lock 23, and the switch may be maintained on the grounded contact when the interlock operator removes key 25. Alteration of the circuit without releasing lock 23 is not thereafter possible.

Fig. 4 shows a standard cable and feeder circuit to which the interlock of the present invention may be applied. Switch blade 58 is shown in the closed circuit condition, and a magnetic latch 59 prevents rotation of a plate 60, since it engages a notch 61 formed on the outer edge of the plate. The electrical circuit for the solenoid is shown as being a simple circuit across the transformer 62 through the energized conductor 63 and the grounded conductor 64, which latter conductor includes the solenoid 59. It will be apparent that if a main switch somewhere along cable 65 is in open condition, then the solenoid circuit will be open when switch 58 is rotated to the closed contact, and plate 60 will not be latched. Rotation of switch 58 may then be had by following the sequence set out above in the description of the interlock 10. The distribution circuit may include not only the transformer 62, but a conventional oil circuit breaker 66, which is in series with the transformer and the branch feeders 67.

Assuming that cable 65 is energized and it is desired to work upon a local feeder circuit without knowledge of whether cable 65 is actually energized, then the interlock operator may insert key 25 within lock 23, and even though he is completely ignorant of the actual circuit position of switch 58, he cannot connect switch 58 to ground (contact G) prior to connecting it to the closed circuit contact (contact C). If the switch happens to be in the closed circuit condition, then magnetic latch 59 prevents rotation of handle 14, even though lock 23 does not engage disc 51. Thus, the switch cannot be grounded for work on a local circuit. Assuming that the switch 58 is in the open circuit condition (on contact O), then shoulder 57 abuts head 45, and switch 58 cannot be rotated clockwise into the grounded circuit condition until after it has been rotated 90 degrees counter-clockwise into the closed circuit condition, during which rotation, of course, head 45 is depressed by cam surface 54.

The dash pot 28 can be given such a rate that piston 43 must be advanced into dash-pot 28 the maximum amount to prevent head 45 from returning into obstructing position too soon to prevent the rotation of shoulder 57 past head 45 in the clockwise direction. The rate of dash-pot 28 can be adjusted by turning valve 35 to increase or decrease the orifice within channel 38. When piston 43 is depressed into dash-pot 28, motion is not retarded, as check valve 39 will be forced open to permit air to be expelled through passageway 40 into cup 19.

The embodiment of the invention above described gives complete control, not only over the sequence of circuit changes, but also over the incident of circuit changes apart from sequence control. If the lock 23 be eliminated, the circuit changing sequence above set forth is still mechanically supervised, but switch 58 cannot be locked in any chosen position. In certain applications of the invention, lock 23 is not essential, though the prevention of grounding an energized feeder is still of prime importance. It will be seen that the present invention has equal utility in each case. It is therefore not intended to limit the invention to the particular form described but solely by the scope of the appended claims.

What is claimed is:

1. A switch rotating member for controlling the rotation of a switch having positions corresponding to closed, open and grounded circuit conditions, comprising a housing, a manually rotatable shaft extending through said housing, a switch-engaging coupling on said shaft, means for selectively locking and unlocking said rotatable shaft in each of the closed, open, and grounded positions above-mentioned, and means including an obstructing member for preventing rotation of said shaft in one direction under certain circuit conditions, and cam means carried by said rotatable shaft for displacing said obstructing member upon rotation of said shaft in an opposite direction, said cam means constituting the sole means for displacing said obstructing member, whereby the latter can not be moved from the obstructing position except by rotation of said shaft in a predetermined direction.

2. A switch rotating member for controlling the rotation of a switch having positions corresponding to closed, open and grounded circuit conditions, comprising a housing, a rotatable shaft extending through said housing, a switch-engaging coupling on said shaft, means for selectively locking and unlocking said rotatable shaft in each of the closed, open and grounded positions above-mentioned, and means including an obstructing member for preventing rotation of said shaft in one direction under certain circuit conditions, means secured to said shaft for displacing said obstructing member upon rotation of said shaft in an opposite direction, and dash-pot means for holding said obstructing member out of shaft-rotation control for a certain interval.

3. A device for regulating the sequence of conditioning a circuit, including a switch having closed, open and grounded positions, comprising a housing, a shaft extending therethrough, a switch-engaging coupling on one end of said shaft, an obstructing member for limiting continuous rotation of said shaft, cam means carried by said shaft for displacing said obstructing member when said shaft is rotated in one direction to permit subsequent rotation of said shaft in said other direction, a cylindrical chamber spaced from said shaft, a piston reciprocable in said chamber, said obstructing member having a rigid connection to said piston, spring means for resiliently urging said obstructing member into rotation limiting relation to said shaft, and flow regulating means carried by said chamber for timing the return of said obstructing member to rotation limiting condition after it has been displaced by said cam means.

4. A supervisory circuit changing device for controlling the operation of a switch in a determined sequence, comprising a casing, a switch-engaging shaft extending through said casing, means for locking said shaft against rotation, an abutment, means having a shoulder engageable with said abutment to limit rotation of said shaft in one direction, and cam means carried by said shaft for displacing said abutment for a determined interval, said cam means constituting the sole means for displacing said obstructing member, whereby the latter can not be moved from the obstructing position except by rotation of said shaft in a predetermined direction.

5. A device for controlling the operation of a mechanism in a determined sequence, comprising a rotatable shaft, an abutment, means having a shoulder engageable with said abutment to limit rotation of said shaft in one direction, and cam means carried by said shaft for displacing said abutment for a determined interval, said cam means constituting the sole means for displacing said obstructing member, whereby the latter can not be moved from the obstructing position except by rotation of said shaft in a predetermined direction.

6. A switch rotating member for controlling the rotation of a switch having positions corresponding to closed, open and grounded circuit conditions, comprising a rotatable shaft, a switch-engaging coupling on said shaft, means including an obstructing member for preventing rotation of said shaft in one direction under certain circuit conditions, means secured to said shaft for displacing said obstructing member upon rotation of said shaft in an opposite direction, and dash-pot means for holding said obstructing member out of shaft-rotation control for a certain interval.

7. A device for regulating the sequence of conditioning a circuit, including a switch, comprising a shaft, a switch-engaging coupling on one end of said shaft, an obstructing member for limiting continuous rotation of said shaft, cam means carried by said shaft for displacing said obstructing member when said shaft is rotated in one direction to permit subsequent rotation of said shaft in said other direction, a cylindrical chamber spaced from said shaft, a piston reciprocable in said chamber, said obstructing member having a connection to said piston, spring means for resiliently urging said obstructing member into rotation limiting relation to said shaft, and flow regulating means carried by said chamber for timing the return of said obstructing member to rotation limiting condition after it has been displaced by said cam means.

GEORGE B. THIEME.